United States Patent [19]
Reno

[11] Patent Number: 6,045,745
[45] Date of Patent: Apr. 4, 2000

[54] WATER SOLUBLE CORES CONTAINING POLYVINYL ALCOHOL BINDERS AND RELATED METHODS

[76] Inventor: Kurtis Pierre Reno, 9053 Skypark Dr., Wadsworth, Ohio 44281

[21] Appl. No.: 09/097,788

[22] Filed: Jun. 15, 1998

Related U.S. Application Data

[62] Division of application No. 08/784,694, Jan. 15, 1997, abandoned.

[51] Int. Cl.[7] ................................ B27N 5/00; B29C 67/00
[52] U.S. Cl. .................... 264/517; 264/109; 264/221; 264/317
[58] Field of Search ..................... 264/517, 109, 264/122, 317, 219, 221

[56] References Cited

U.S. PATENT DOCUMENTS

| | | | |
|---|---|---|---|
| 3,645,937 | 2/1972 | Lang et al. ................................ | 260/17 |
| 4,331,197 | 5/1982 | Cole ......................................... | 164/522 |
| 4,904,423 | 2/1990 | Foreman et al. .......................... | 264/317 |
| 5,126,089 | 6/1992 | Johnson et al. ........................... | 264/317 |
| 5,262,100 | 11/1993 | Moore et al. .............................. | 264/25 |
| 5,294,094 | 3/1994 | Crafton et al. ............................ | 266/44 |
| 5,350,160 | 9/1994 | Crafton et al. ........................... | 266/252 |
| 5,354,788 | 10/1994 | Johnson et al. .......................... | 523/145 |
| 5,372,768 | 12/1994 | Solomon .................................. | 264/317 |
| 5,423,370 | 6/1995 | Bonnemasou et al. ................. | 164/132 |
| 5,460,854 | 10/1995 | Krug .................................... | 427/393.6 |

*Primary Examiner*—Mary Lynn Theisen
*Attorney, Agent, or Firm*—Renner, Kenner, Greive, Bobak, Taylor & Weber

[57] ABSTRACT

A water soluble core comprising iggregate particles of an inert material and water soluble polyvinyl alcohol (PVA) binder results in an improved core composition having a longer shelf life and better release properties than other water soluble cores. The resultant core can be produced in less time and with less energy than other seater soluble cores, but is just as effectively remove d from the molded product upon exposure to water.

7 Claims, No Drawings

WATER SOLUBLE CORES CONTAINING POLYVINYL ALCOHOL BINDERS AND RELATED METHODS

This application is a divisional of U.S. Ser. No. 08/784,694, filed Jan. 15, 1997, now abandoned.

TECHNICAL FIELD

This invention generally relates to water soluble cores and, more particularly, to the use of polyvinyl alcohol (PVA) to bend sand and/or other aggregate particles together in the production of such cores for the non-foundry core industry. Methods for the production of such water soluble cores as well as for the removal thereof from molded products of plastic, wax, etc., in non-foundry industries, such as the investment casting industry, are also suggested.

BACKGROUND OF THE INVENTION

In the manufacture of certain molded products, it is necessary that particular pathways, chambers, or other openings be created within the molded products in order for them to accomplish their intended service application. For example, various plastic automotive parts often require channels or openings therein through which various fluids flow. Oftentimes, these openings cannot be made using permanent, reusable molds and the like, and the only manner by which to produce these openings is to mold the product around a one time only core complementing the configuration of the intended openings, and then, to destroy or disintegrate the core, thereby leaving the openings available for their intended purpose.

Such cores are commonly used in the foundry and investment casting industries and must be made of materials which are not only dimensionally agile enough to be formed into discrete, complex shapes or configurations so as to complement the voids or openings to be created in the molded product, but also must be mechanically and chemically strong enough to withstand the molding process for the application they are intended, yet mechanically or chemically weak enough to be easily destroyed and disintegrated upon completion of the molding process.

Over the years, various materials and procedures have been employed in the forming and removal of such cores. In the foundry industry, various low melt metals, such as tin, bismuth and other low melt alloys, have been used to form the complementary, complex shape of the desired opening. This metal core was then positioned in the mold and the material from the finished product, e.g., a high temperature metal, was pored or injected in to the mold about the core. Once the material solidified or was cured, the entire product was heated to a temperature above the melting point of the metal core, and the melted material was removed by slowly pouring it out of the resultant product.

Similarly, foundry sand compositions wherein the sand particles have been bound together by particular binder materials, such as phenolic resins, have been used to form foundry cores. After forming the cores, they were then positioned in the mold and subjected to the materials (e.g., metals) of the finished product during the molding process. Typically, the binder materials in the cores were designed to degrade or decompose upon the application of the high temperatures required to cure the resultant product, thereby significantly weakening the remaining sand core. Thus, once the molded product was solidified or cured, the core sand was easily removed by vibrating the product to disintegrate the core, and/or blowing the remaining sand or other particles out of the resultant shell.

However, it will be appreciated that these methods depend significantly upon the application of heat or, at least, upon the use of extremely high temperatures to obtain the intended result. While these procedures may be suitable for the foundry industry, they are, oftentimes, not suitable for the investment casting industry or other industries where non-metal products such as those made of plastics, waxes, and polymeric materials cannot be subjected to these extreme temperatures.

Thus, other methods for the production and removal of cores have been developed. For example, U.S. Pat. No. 5,262,100 relates to a method for the removal of a sand core from a molded product by using a heat-cured, water soluble binder such as silicate salt (e.g., sodium silicate or potassium silicate), plastic firebrick, gelatin, or resinate salt. That is, after the resultant, flinised product has been molded, the core is exposed to water so as to rapidly disintegrate and wash away the core.

Such water soluble cores offer sign ficant advantages over certain other types of cores in that they often require less tooling and can be made with less costly materials. The ability to collect and recover the remaining sand and/or aggregate particles for reuse in also seen as advantageous. Moreover, these cores operate at relatively low temperatures (typically in the range of from about 150° F. to about 250° F.) compared to non-water soluble, foundry cores (where temperatures may reach 1300° F. or higher), thereby requiring less heat energ) to use them as compared to certain non-water soluble, foundry cores.

Unfortunately, the water soluble cores described hereinabove suffer from the disadvantage in that the water soluble binders employed, e.g., sodium silicate, are significantly hygroscopic. Thus, it is often difficult to remove all of the water from the core, requiring additional time (2–5 minutes) and energy in the production thereof, and it is even more difficult to keep water away from the core. Thus, as soon as the core is produced, it must be placed in a container so prevent water from contacting it. Even then, due to the hygroscopic nature of the binder materials, the shelf life of each core is relatively short, and far less than for other cores.

Moreover, these binders can be very tacky if they are not used in just the right amounts for the production of the core. Thus, having the resultant core stick to the manufacturing dye remains a potential problem.

Thus, the need exists for a core comprising a water soluble binder which is not as readily hygroscopic of those binders des;cribed hereinabove, and has better release properties than other water soluble binders.

SUMMARY OF INVENTION

It is therefore, an object of the present invention to provide a water soluble core suitable for use in the investment casting; and other low-temperature, non-foundry molding industries.

It is another object of the present invention to provide a water soluble core, as above, which contains a suitable binder and other additives for enhancing the removal of the core from the molded product after encapsulation.

It is yet another object of the present invention to provide a water soluble core, as above, which is not readily hygroscopic and has a significantly longer shelf life than other water soluble cores.

It is still another object of the present invention to provide a water soluble core, as above, which will not readily stick lo the casting dye.

It is a further object to provide a method for the production of a water soluble core, as above, which requires significantly less time and energy to produce.

It is still a further object to provide a method for the removal of such water soluble cores from molded products of plastic, wax, etc., in non-foundry related industries.

At least one or more of the foregoing objects, together with the advantages thereof over the known art relating to water soluble cores, which shall become apparent from the specification which follows, are accomplished by the invention as hereinafter described and claimed.

In general the present invention provides a low-temperature, non-foundry core composition conforming to a configuration complementary to the cavity to be created in a molded product, the core composition comprising aggregate particles of an inert material; and a water soluble polyvinyl alcohol binder for holding the aggregate particles together in the configuration complementary to the cavity, wherein the water soluble polyvinyl alcohol binder is less hygroscopic than other water soluble binders.

The present invention also includes a method for the production of water soluble cores comprising aggregate particles of inert material and a binder containing polyvinyl alcohol, comprising blowing the aggregate particles and the binder into a molding cavity to form the core; and curing the core by passing air having a temperature of about 150° F. to about 250° F. through the core for a period of time ranging from about thirty seconds to two minutes.

The present invention further includes a method for removing a core from a molded product after the product has been molded, wherein the core comprises water soluble polyvinyl alcohol and aggregate particles of an inert material formed into a discrete configuration complementary to a cavity in the molded product, the method comprising exposing the polyvinyl alcohol and the aggregate particles to an effective amount of water to dissolve the polyvinyl alcohol and disintegrate the core; and removing the aggregate particles from the cavity of the molded product.

PREFERRED EMBODIMENT FOR CARRYING OUT THE INVENTION

The present invention is direct toward a novel water soluble core composition of sand or similar aggregate particles, wherein polyvinyl alcohol (PVA) is used as the water soluble binder in order to provide the composition with enhanced properties not found in other water soluble cores. While PVA has long been used to bind sand and other aggregate particles, it has not heretofore been used in water soluble cores. In fact, efforts heretofore have been directed toward keeping water away from PVA binders, not for utilizing water to solubilize the binder and disintegrate the core.

For example, sand cores employing PVA as a binder material have been used primarily in the foundry core industry where the core binder is typically burned out of the core, leaving the remaining particles to be blown out of the resultant part. Since PVA decomposes at temperatures approaching 400° F., it was easily destroyed in the molding processes used in foundry industry which typically reach 1300° F. or higher.

The core composition of the preferred embodiment includes a modified PVA binder to bond sand or other aggregate particles into the form or configuration complementary to the opening to be created in the resultant molded investment or product. Essentially any inert material which can be held together by the PVA binder and which is capable of withstanding the processes employed in the formation of the core and the formation of the finished product can be used in the present invention. Sand is particularly suitable inasmuch as it is plentiful and inexpensive for use in the manufacture of the core, but other aggregate particles of essentially any inert material may be employed.

In the preferred embodiment, up to about 3 percent by weight of binder and water may be used to bind the sand or aggregate particles. In other words, up to about 0.5 percent binder solids may be used to bind the sand. It will be appreciated that the water employed in the composition will be evaporated out of the core composition during the formation process.

The binder of the present invention includes PVA, and, if desired, a lignin sulfonate, a surfactant, and/or preservative to modify the PVA. PVA may be used in the range of not less than about 50 percent based upon the weight of the binder. Preferably, partially hydrolyzed, low molecular weight PVA is employed in an amount ranging from about 90 to 100 percent based upon the weight of the binder, with 95 percent by weight being most preferred.

PVA is advantageous as the binder in that it is not sufficiently hygroscopic, like currently utilized water soluble binders, e.g., sodium silicate, to be detrimental to the life of the core. Thus, it is not necessary to place a core composition employing PVA as the binder material in a container immediately after formation of the core in order to prevent water from contacting it. Moreover, since PVA is not as highly hygroscopic as these other water soluble binders, the core may remain unused for a longer period of time than other cores containing these other water soluble binders. In fact, the core of the present invention employing a PVA binder is generally considered to have an infinite shelf life, although cores are typically used within about one year after manufacture. PVA also is non-toxic and has better release properties than other water soluble binders currently available on the market.

Lignin sulfonate, if used, may be used in amounts of up to about 50 percent by weight of the binder solids, although amounts ranging from about 5 to 10 percent are more preferred, and about 5 percent by weight of the binder is most preferred. Lignin sulfonate is used as an extender resin which allows the binder to completely coat the sand or other aggregate particles so as to prevent some of the particles from crumbling away from the core during handling or during processing. However, the particles remain sufficiently capable of being blown into the casting die during the manufacturing process.

Essentially any lignin sulfonate which is compatible with PVA may be used in the present invention. Preferred lignin sulfonates include calcium lignin sulfonate and ammonium lignin sulfonate, since they appear to provide the most beneficial effect with respect to the properties sought in the use of such resins.

Any surfactant which can provide the desired effect of reducing the viscosity of the composition and aid in coating the aggregate particles can be utilized in the present invention. To date, the surfactant, Octoxynol-9, available from Union Carbide under the tradename Triton X-100, has been found to very suitable for this purpose. The surfactant, if used, may be used in amounts up to about 15 percent by weight of the binder solids, although amounts ranging from about 2 to 8 percent are more preferred, with about 5 percent by weight of the binder being most preferred. Extremely low amounts of surfactant may increase the problems associated with variation in ability to blow a sand or aggregate particle mix into a cavity on automated equipment in view of the gelling tendency of the composition, and extremely high amounts tend to increase cost and foaming tendency without many further beneficial effects.

Preservatives may be added to prevent mold and spoilage of the binders during storage. Of course, amounts will vary depending upon the preservative employed, but generally, amounts up to about 1 percent are considered sufficient. One preferred preservative is sodium benzoate which is typically utilized in an amount of about 0.2 percent based upon the weight of the binder. Essentially any preservative which is compatible with the binder and various other additives and which is environmentally safe can be used in the present invention.

To produce the core composition of the present invention, the binder ingredients are mixed with sand and water and are blown into a molding cavity configured to be an exact replica of the cavity walls in the finished part or investment to be manufactured. More particularly, the water soluble core composition is produced by blowing the sand or aggregate particles, together with the binder, into a mold where warm air is passed through it in order to cure the core. The warm air is introduced through the core in order to rid the core of any water. A cure temperature of between 150° F. and 250° F. is typically used, although lower temperatures may be possible., and the entire curing process takes only thirty seconds to two minutes.

It is far easier to remove and keep, water away from PVA than other water soluble binders. Thus, it has been found than curing the core at about 225° F. for about forty seconds to about two minutes is sufficient to cure the most sand core compositions. In comparison, sodium silicate and other water soluble binders must be heated for well over two minutes, and probably closer to four minutes, in order to insure that all water has been remove, and can only be cured at temperatures approaching 200° F. Otherwise, the binder material will begin to degrade. Thus, it will be appreciated that the production of core compositions containing PVA can be done faster, and with less energy, than the production of core compositions containing other types of water soluble binders.

It should be pointed out, however, that PVA should not be processed or used in applications above about 250° F. because at those temperatures, PVA may become insoluble in water. In fact, at temperatures around 275° F., PVA becomes plastic and rigid and cannot be solubilized in cold water. Thus, it will be appreciated that the core compositions of the present invention, while suitable for use in the investment casting industry and other molding industries which do not employ extremely high temperatures on the order of 350° F. and above, cannot be used in the foundry industry or the like, essentially because the binder to burn out at these higher temperatures.

Once the core composition is formed and because the core is sufficiently nonhygroscopic, it may then be sprayed or washed in a water soluble core wash as is known in the art. This core wash improves the finish on the resultant core which is often necessary in the investment casting industry to, inter alia, prevent the wax or other material employed from penetrating the surface of the core during molding of the investment or finished part. Notably, other watter soluble binder often have a significant amount of the wash penetrate the surface of the core, thereby weakening the core to some degree. The cores of the present invention are nonhygroscopic enough to allow coatings and low melting point materials to be applied which improves the finish of the surface of the core and/or which do not penetrate the surface. Moreover, the core is capable of redrying and becoming hard again.

The resultant core composition may be used in a variety of casting or molding processes. It is particularly useful in the investment casting industry where it is placed into a mold and the material from which the investment is to be made, e.g., wax, plastic, nylon, etc., is pored or injected in to the mold about the core. The investment or product substantially encapsulates the core and is then allowed to cure.

Removal of the core after encapsilation in plastic, wax or other material is effected by the exposure of the core to an effective amount of water to dissolve the core binder, i.e., PVA or modified PVA, and to rinse or wash the aggregate particles out of the resultant investment or product. Of course, the sand or aggregate particles may be alternatively removed by blowing them out of the product.

Thus it should be evident that the composition and methods of the present invention are highly effective in the production of water soluble cores for the non-foundry core industry where processing and service temperatures do not exceed about 250° F., and, more preferably, about 225° F. The invention is particularly suited for the investment casting industry, but is not necessarily limited thereto. Other industries where this type of core may be used include the dye casting or aluminum industries. The device and method of the present invention can be used separately with other equipment, methods and the like, as well as for the manufacture of other investment cores.

Based upon the foregoing disclosure, it should now be apparent that the use of the core composition described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the use of cores according to the present invention is not necessarily limited to those employing sand. Aggregate particles of any inert material is believed suitable. Moreover, as noted hereinabove, other means for removal of the sand or aggregate particles can be substituted for the rinsing and wash process or air blowing process described. Thus, the scope of the invention shall include all modifications and variations that may fall within the scope of the attached claims.

What is claimed is:

1. A method for the production of water soluble cores comprising aggregate particles of inert material and a binder containing polyvinyl alcohol and lignin sulfonate, comprising:

blowing the aggregate particles and the binder into a molding cavity to form the core; and curing the core by passing air having a temperature of about 150° F. to about 250° F. through the core for a period of time ranging from about thirty seconds to two minutes.

2. A method, as set forth in claim 1, wherein said binder includes from about 50 to 100 percent by weight polyvinyl alcohol; up to about 50 percent by weight lignin sulfonate, based upon the weight of the binder; from 0 to about 15 percent by weight surfactant, based upon the weight of the binder; and from 0 to about 1 percent preservative, based upon the weight of the binder.

3. A method, as set forth in claim 1, wherein said aggregate particles are sand, and wherein the step of curing includes passing air having a temperature of about 225° F. through the sand core for a period ranging from about forty seconds to two minutes.

4. A method, as set forth in claim 1, further comprising:

washing the core in a core wash to improve the finish of the core.

5. A method for removing a core from a molded product after the product has been molded, wherein the core comprises water soluble polyvinyl alcohol, lignin sulfonate, and aggregate particles of an inert material formed into a discrete configuration complementary to a cavity in the molded product, the method comprising:

exposing the polyvinyl alcohol, the lignin sulfonate, and the aggregate particles to an effective amount of water to dissolve the polyvinyl alcohol and disintegrate the core; and removing the aggregate particles from the cavity of the molded product.

6. A method, as set forth in claim 5, wherein said step of removing includes washing the aggregate particles from the cavity.

7. A method, as set forth in claim 5, wherein said step of removing includes blowing the aggregate particles from the cavity.

* * * * *